(12) United States Patent
Freienstein et al.

(10) Patent No.: US 10,913,450 B2
(45) Date of Patent: Feb. 9, 2021

(54) METHOD AND DEVICE FOR DETECTING A RULE INFRINGEMENT

(71) Applicant: Robert Bosch GmbH, Stuttgart (DE)

(72) Inventors: Heiko Freienstein, Weil der Stadt (DE); Florian Oesterle, Stuttgart (DE); Joerg Moennich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 15/803,285

(22) Filed: Nov. 3, 2017

(65) Prior Publication Data
US 2018/0134282 A1    May 17, 2018

(30) Foreign Application Priority Data
Nov. 16, 2016  (DE) .................. 10 2016 222 505

(51) Int. Cl.
| | |
|---|---|
| *B60W 30/08* | (2012.01) |
| *B60R 21/013* | (2006.01) |
| *G08G 1/017* | (2006.01) |
| *G05D 1/00* | (2006.01) |
| *G08G 1/01* | (2006.01) |
| *G08G 1/04* | (2006.01) |
| *G08G 1/16* | (2006.01) |
| *G08G 1/0967* | (2006.01) |

(Continued)

(52) U.S. Cl.
CPC .......... *B60W 30/08* (2013.01); *B60R 21/013* (2013.01); *G05D 1/0061* (2013.01); *G08G 1/017* (2013.01); *G08G 1/0112* (2013.01); *G08G 1/0116* (2013.01); *G08G 1/0133* (2013.01); *G08G 1/0141* (2013.01); *G08G 1/04* (2013.01); *G08G 1/052* (2013.01); *G08G 1/096716* (2013.01); *G08G 1/096725* (2013.01); *G08G 1/096791* (2013.01); *G08G 1/162* (2013.01); *G08G 1/163* (2013.01); *B60R 2021/01286* (2013.01); *B60W 2554/801* (2020.02); *B60W 2555/60* (2020.02)

(58) Field of Classification Search
CPC ....... B60W 2550/30; B60W 2550/308; B60W 30/08; G05D 1/0055; G05D 1/0061; G08G 1/0112; G08G 1/017; G08G 1/052; G08G 1/096716; G08G 1/096725; G08G 1/096791; G08G 1/16; G08G 1/161; G08G 1/162
See application file for complete search history.

(56) References Cited

U.S. PATENT DOCUMENTS

| | | | |
|---|---|---|---|
| 2002/0105423 A1* | 8/2002 | Rast ................... | B60Q 1/44 340/479 |
| 2012/0274481 A1* | 11/2012 | Ginsberg .......... | G08G 1/096883 340/905 |

FOREIGN PATENT DOCUMENTS

| | | |
|---|---|---|
| DE | 10244205 A1 | 3/2004 |
| DE | 102004014540 A1 | 11/2004 |

(Continued)

*Primary Examiner* — Charles J Han
(74) *Attorney, Agent, or Firm* — Norton Rose Fulbright US LLP; Gerard Messina (57) ABSTRACT

A method for detecting a committed rule infringement and/or an atypical vehicle state of a vehicle. The method includes: receiving environmental data acquired with the aid of an environmental sensor system; ascertaining a vehicle behavior and/or a vehicle state of a vehicle based on the environmental data; detecting a committed rule infringement and/or an atypical vehicle state of the vehicle based on the ascertained vehicle behavior and/or vehicle state.

9 Claims, 4 Drawing Sheets

(51) Int. Cl.
*G08G 1/052* (2006.01)
*B60R 21/01* (2006.01)

(56) References Cited

FOREIGN PATENT DOCUMENTS

DE 102007039039 A1 1/2009
DE 102011114888 A1 4/2013

* cited by examiner

METHOD AND DEVICE FOR DETECTING A RULE INFRINGEMENT

CROSS REFERENCE

The present application claims the benefit under 35 U.S.C. § 119 of German Patent Application No. DE 102016222505.7 filed on Nov. 16, 2016, which is expressly incorporated herein by reference in its entirety.

BACKGROUND INFORMATION

The present invention relates to a method and to a device for detecting a rule infringement.

German Patent Application No. DE 10 2004 014 540 A1 describes a vehicle control device for a vehicle including a situation-determination unit, which determines a current situation of the vehicle on the basis of information. In addition, the vehicle control device has a danger-determination unit, which determines a danger degree based on the previously determined situation. With the aid of a vehicle controller, predefined units in the vehicle are controlled in such a way that the danger degree is reduced.

SUMMARY

The present invention describes a method for detecting a committed rule infringement and/or an atypical vehicle state of a vehicle. The method has the following steps: Receiving environmental data acquired with the aid of an environmental sensor system; ascertaining a vehicle behavior and/or a vehicle state of the vehicle on the basis of the environmental data; detecting a committed rule infringement and/or an atypical vehicle state of the vehicle on the basis of the ascertained vehicle behavior and/or the vehicle state.

For example, an atypical vehicle state may mean that the vehicle is on fire, that a tire of the vehicle is low on air and/or is flat, that the vehicle emits smoke or weaves from side to side, and/or that it brakes and/or accelerates repeatedly without any discernible reason for such behavior.

The present method is able to be carried out in a vehicle and/or on a server, for instance. If the method is carried out in a vehicle, then an interface via which an item of information pertaining to the detected rule infringement and/or the atypical vehicle state may be transmitted to a safety and/or driving function of the vehicle, may be considered for this purpose.

If the present method is carried out on an external server such as a cloud, for example, then this item of information is able to be received by a vehicle via a corresponding receive device, such as a radio, or via the Internet, and an item of information regarding a detected rule infringement and/or an atypical vehicle state can be forwarded via a suitable interface to a safety and/or driving function of the vehicle.

After the detection of a committed rule infringement and/or an atypical vehicle state of a vehicle, it is therefore possible to generate a signal that represents the committed rule infringement and/or the atypical vehicle state. As a result, the present method would involve a method for generating a signal that represents a committed rule infringement and/or an atypical vehicle state of a vehicle, the signal being generated on the basis of the detection of a committed rule infringement and/or an atypical vehicle state.

In addition, this method may include the step of providing the signal; for instance, it may be provided to a transmit unit that outputs the signal to a cloud or to vehicles, and/or to an internal interface, which makes the signal available to some other function such as a driving function and/or a safety function of a vehicle. The manner in which the signal is processed further may depend on where the method is executed, for example. It is also possible to actuate a warning device that warns a vehicle occupant or other road users that a rule infringement of another vehicle and/or an atypical vehicle state was/were detected.

The environmental data acquired with the aid of the environmental sensor system involve data and/or images from a camera, a lidar sensor, an ultrasonic sensor, or a radar sensor, for example. It is also possible to use additional sensors for generating the environmental data. Environmental data refer to data in the environment of the vehicle. Depending on the sensor system that is used, this environment may be smaller or larger, e.g., have a radius between 50 m and 1 km. The environmental sensor system need not necessarily be installed on the vehicle. Data from a drone detecting an environment of the vehicle with the aid of suitable sensors, for instance, may also be involved. In addition, it is also possible to use data from sensors that are mounted on infrastructure devices, for example, such as cameras for monitoring traffic, always provided they have a suitable interface for the data transmission.

For instance, a conventional object-detection algorithm may be employed for ascertaining a vehicle behavior and/or a vehicle state on the basis of the environmental data. In the detection it is the vehicle or the vehicle behavior in relation to its environment, in particular, that is to be examined. For example, it may be ascertained whether the vehicle crosses marked road lines, or in which traffic lane the vehicle is located, how fast it approaches certain traffic signs, e.g., signs or a traffic light, or how it behaves in specific traffic situations such as at an intersection.

The ascertainment of the vehicle state of the vehicle may furthermore involve a detailed analysis of the vehicle. With the aid of an object-detection algorithm, for example, individual components of the vehicle such as the tires, the state of the headlights, e.g., whether they are on or off, are able to be identified.

A detection of a committed rule infringement and/or an atypical vehicle state may subsequently be carried out by comparing the ascertained vehicle behavior and/or the vehicle state with an expected vehicle behavior and/or an expected vehicle state. Values to be expected can or may be stored in a memory. With regard to the detection of a committed rule infringement, for instance, the road traffic act may serve as guidance. In addition, characteristic curves and/or threshold values pertaining to different properties of the vehicles may be defined for the detection of an atypical vehicle state. For instance, a vehicle state will be detected as atypical if the cumulative change in the lateral position of the vehicle in relation to a traffic lane boundary exceeds a predefined threshold value within a predefined time period. In addition, threshold values may be established for accelerations within a defined time period, so that repeated excessive braking and accelerating are detectable as atypical behavior.

In addition, for example, images of different vehicles from different viewpoints, which correspond to a "normal state" of a vehicle, may be stored. An ascertained vehicle state may then be compared to these data in order to detect an atypical vehicle state.

In this context, a vehicle may describe any vehicle that is able to participate in road traffic. Among them, for example, are cars, trucks, bicycles, motorcycles, motor scooters, scooters, E-bikes, bobby cars, Kettcars, Segways, tricycles or hover boards.

Detecting a committed rule infringement and/or an atypical vehicle state with the aid of the method according to the present invention provides for greater safety in road traffic. Accidents are avoidable by forwarding a detected committed rule infringement and/or a detected atypical vehicle state to other functions, such as driving functions for highly automated driving, and/or safety functions, which are able to actuate occupant protection devices such as belt pretensioners, airbags, or pedestrian airbags, for instance, and a likelihood of injury for vehicle occupants and other road users such as pedestrians is able to be reduced.

In addition, a method is claimed for adapting a driving and/or safety function of a vehicle as a function of a detected committed rule infringement and/or a detected atypical vehicle state of at least one further vehicle. This method includes the following steps:

Receiving a signal that represents a detected committed rule infringement and/or a detected atypical vehicle state of the further vehicle, and/or detecting a committed rule infringement and/or an atypical vehicle state of the further vehicle. In this case, the detection of a committed rule infringement and/or of an atypical vehicle state may particularly be carried out according to the afore-described method for detecting a committed rule infringement and/or an atypical vehicle state of a vehicle.

Adapting the driving and/or safety functions of the vehicle as a function of the received signal and/or the detected committed rule infringement and/or the detected atypical vehicle state.

For example, the driving function may involve a partially or highly automated driving function of a vehicle that is able to influence the transverse and/or linear dynamics of the vehicle, for instance. The driving function may also involve a function that assumes all tasks required for a driving operation of the vehicle.

The safety function of the vehicle may be an integral-safety protection function, for instance. For example, it may be set up to actuate occupant-protection devices such as belt pretensioners or airbags. In addition or as an alternative, the safety function is also able to actuate devices for transmitting information to a driver and/or vehicle occupant, e.g., for the generation of optical, acoustic, or haptic signals.

This method offers the advantage of increasing the safety in road traffic.

In another specific embodiment of the present method, the driving function assumes at least part of a driving task of the vehicle. In the step of adapting the driving function, the driving task assumed by the driving function is handed back to the driver.

This specific embodiment offers the advantage of increasing the safety for road users in the presence of vehicles that are operated in an automated manner. When a committed rule infringement and/or an atypical vehicle state is/are detected, a traffic situation may be at hand that could be difficult to interpret or that may be dangerous and require particular attention. Returning the driving function after a corresponding detection ensures a reduced likelihood of accidents and/or traffic impediments by vehicles operated in an automated manner in traffic situations that are difficult to interpret or that are possibly dangerous.

In one advantageous specific embodiment of the present invention, the vehicle has at least one occupant-protection device, which is actuated by the safety function. The actuation of the occupant-protection device is adapted when adapting the safety function.

For example, the occupant-protection device may be a restraining device in a vehicle or, generally, protection devices for reducing injuries of road users. Included among them are also protection devices that do not protect the vehicle occupants but rather pedestrians or occupants of other vehicles, for example, such as pedestrian airbags or active crash structures. Since the positioning of occupants in the event of a crash is also of great importance, all actuable positioning devices may likewise act as occupant-protection devices. For example, an actuation of a seat may be carried out, which brings a vehicle occupant into an optimal position prior to an accident. To do so, a forward motion and/or a position of the vehicle passenger may be ascertained in an additional step. The seat may then be rotated or modified in its position; for instance, a backrest may be straightened or further inclined, or a headrest may be adapted.

In addition, when adapting the safety function, the availability of occupant protection devices may be prepared or a temporally adapted, especially earlier, triggering of such devices may take place. For example, trigger thresholds may be lowered for this purpose, so that the triggering of an occupant-protection device occurs already in response to minor collisions of the vehicle. In the same way, the type of actuation of occupant-protection devices is able to be modified, for instance by triggering them earlier, later, harder or softer. In the case of airbags, this is possible, among other things, by igniting a plurality of ignition pills, or by adapting the inflow of gas into the airbags with the aid of suitable valves. Moreover, during the adaptation it is also possible to stipulate which particular occupant-protection devices will be triggered, e.g., which airbags and of which side and after what time.

This specific embodiment of the present method offers the advantage that a timely triggering of an occupant-restraining device that is adapted to an accident situation is able to be carried out, which increases the safety of road users.

In one advantageous development of the present method, a trigger threshold for triggering the occupant-protection device is adapted when adapting the actuation of the occupant-protection device, the threshold being reduced, in particular.

This specific embodiment of the present method also offers the advantage of increasing the safety of vehicle occupants and other road users.

At least one signal from an acceleration or pressure sensor is frequently evaluated in vehicles. In the process, the at least one signal is conditioned in in a variety of ways, and the result is subsequently compared to predefined threshold values. In order to avoid faulty triggering events, usually a wait takes place until a specific threshold value has been exceeded before activatable occupant-protection devices are triggered. If a committed rule infringement and/or an atypical vehicle state of a vehicle is/are detected, then it is possible to adapt, e.g., lower, this threshold value so that an earlier triggering of the passenger protection device takes place. Since an accident was already expected, a second plausibilization signal is available that allows for the lowering of a trigger threshold without increasing the likelihood of faulty triggering events. This creates a more sensitive safety system, which remains robust with respect to faulty triggering at the same time.

In one advantageous development of the present method, the driving function is adapted in such a way that a safety distance from the further vehicle for which a committed rule infringement and/or an atypical vehicle state was/were detected is maintained or established.

This specific embodiment offers the advantage of reducing the likelihood of an accident as a result of the further vehicle.

In this case, the safety distance may be maintained in different ways. For example, a direct adjustment of the distance in relation to the other vehicle is possible. Moreover, for instance, a safety distance to other vehicles that are located between the vehicle and the further vehicle may be established. This makes it possible to avoid subsequent collisions in the event that a dangerous situation arises, such as a strong deceleration or a collision of the other vehicle with the further vehicle, or by road users that are affected by the behavior or the state of the further vehicle. The distance calculation may therefore also relate to additional vehicles that have committed no rule infringement or exhibit no atypical vehicle state.

In one further specific embodiment of the present invention, the vehicle includes a position-determination unit and an internal memory and/or a communications unit. When a committed rule infringement and/or an atypical vehicle state of at least one further vehicle is/are detected, the position of the committed rule infringement and/or of the occurrence of the atypical vehicle state is detected with the aid of the position-determination unit and then stored in the memory and/or transmitted to an external server with the aid of the communications unit.

This specific embodiment offers the advantage of further increasing the safety in road traffic for the driver of the vehicle and possibly also for other vehicles and road users.

Because a position at which a committed rule infringement and/or the occurrence of the atypical vehicle state was/were detected is marked or detected, this information is able to be made available to other functions. If the position is stored in an internal memory, then this provides the option of initiating special measures already when passing this position anew, e.g., driving especially carefully, particularly slowly, or in that a driving function and/or a safety function is/are adapted without the detection of another committed rule infringement and/or another atypical driving state. Dangerous entrances or exits or intersections are able to be marked in such a way.

The transmission of the position to an external server makes it possible to evaluate this information more precisely and possibly also to make it available to other road users. Positions from which dangers may generally emanate are able to be determined, which increases the safety in road traffic as a whole.

In one further specific embodiment of the present method, the driving and/or safety functions is/are adapted as a function of a number of detected committed rule infringements and/or atypical vehicle states.

This specific embodiment of the present method is advantageous inasmuch as a plausibilization of a potential danger situation takes place.

In the process, various detected committed rule infringements and/or atypical vehicle states may occur in a temporally cohesive traffic situation of a vehicle. For example, multiple rule infringements of one or more vehicles may be detected one after the other. As an alternative, an item of information pertaining to committed rule infringements or detected atypical driving states may also be received from additional vehicles or from a server and possibly be compared with data acquired by the vehicle itself. The detected rule infringements and/or atypical vehicle states may be summed up, and an adaptation of a safety and/or driving function take place in a manner that is adapted to said number.

In addition, it is possible to evaluate rule infringements or atypical vehicle states that were detected independently of the time. If the positions at which a detection has taken place are stored, they are then able to be compared to wide positions where a detection has also taken place. This allows for the ascertainment of positions at which there is a greater probability of the occurrence of rule infringements and/or atypical vehicle states. If these positions are forwarded to vehicles, then safety and/or driving functions are able to be adapted appropriately, thereby further increasing the traffic safety. For example, multiple infringements of the traffic rules may be added up to a more pronounced feature, which allows for a plausibilization of a dangerous situation.

In one further specific embodiment of the present method, the vehicle is equipped with a communications interface. This communications interface is used for transmitting an item of information pertaining to a detected committed rule infringement and/or an atypical vehicle state of at least one other vehicle to at least one further road user and/or to an external server.

This specific embodiment offers the advantage that an item of information pertaining to a potential danger to road traffic is able to be transmitted to other road users, which further increases the safety of all road users.

The transmission may take place either to an external server, such as a cloud, or directly to other road users, in particular to other vehicles. Various types of transmission methods may be used for this purpose, such as a transmission per radio or Internet. The information can also be transmitted to pedestrians, e.g., to their smartphones or to corresponding devices that are configured for the reception of such signals.

Possible, for instance, are traffic chips for pedestrians or children that vibrate heavily when such a signal is received. In this way, pedestrians, for example, are able to be made aware of an approaching vehicle that is driving too fast or is ignoring other traffic rules. Moreover, the information may also be transmitted to intelligent traffic signs that are able to forward the information, either per radio or possibly optically, to additional road users. The external server may be situated on the traffic signs or on a central unit that actuates the traffic signs.

In addition, a computer program is provided, which is designed to execute one of the afore-described methods.

Furthermore, a machine-readable storage medium is provided on which a computer program is stored that induces a processing unit to execute a method according to the above embodiments when the computer program is running on the processing unit.

Another advantageous specific embodiment of the present invention manifests itself in the likewise provided processing unit, in particular in a controller for an electric machine that, on account of the computer program provided on the processing unit, especially on a storage medium of the processing unit, and/or on account of a corresponding integrated circuit, is developed to execute a method according to the afore-described embodiments. This results in synergies inasmuch as the processing unit, and in particular the controller, is used not only for controlling the electric machine, e.g., of the vehicle and/or of safety devices/occupant-protection devices of the vehicle, but also for executing the method according to the present invention.

DETAILED DESCRIPTION OF EXAMPLE EMBODIMENTS

Figure 1:
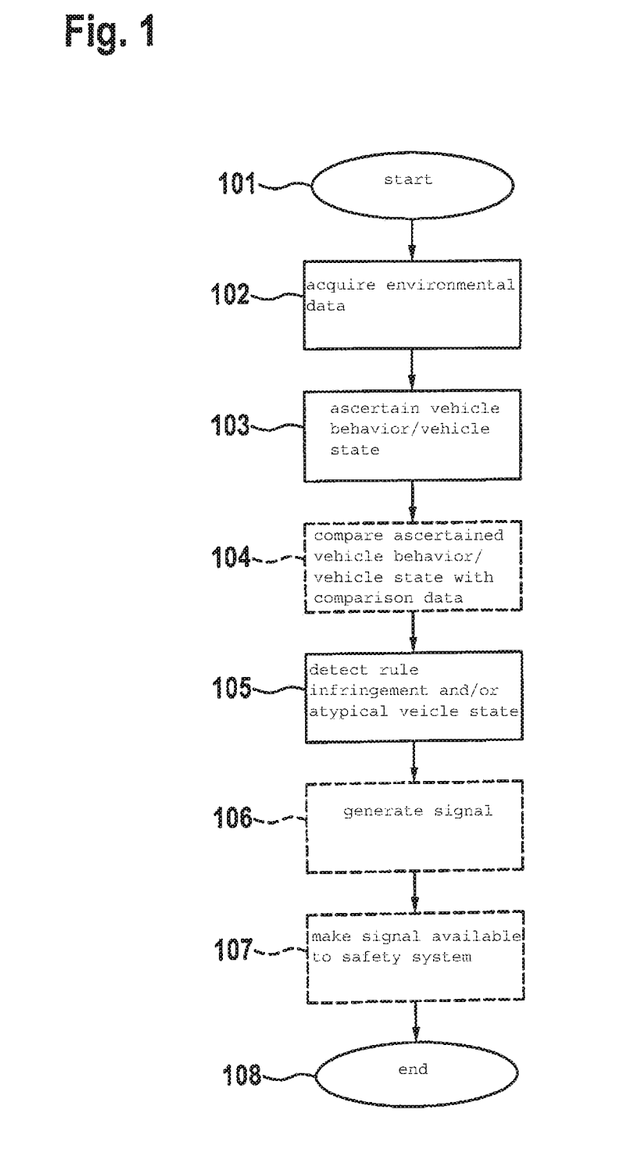
FIG. 1 shows a schematic method diagram.

FIG. 1 outlines one possible specific embodiment of the present method for detecting a committed rule infringement and/or an atypical vehicle state of a vehicle. The method begins in step 101.

In step 102, environmental data, acquired with the aid of an environmental sensor system, are received. In this particular exemplary embodiment, these are image data from a camera mounted inside a vehicle.

In step 103, an ascertainment of the vehicle behavior and/or a vehicle state on the basis of the environmental data takes place. For this purpose, a vehicle is identified based on the environmental data, and its vehicle behavior and/or vehicle state is/are detected.

In step 105, a committed rule infringement and/or an atypical vehicle state is/are detected with the aid of the ascertained vehicle behavior and/or vehicle state. The vehicle behavior and/or the ascertained vehicle state determined in step 103 is/are evaluated for this purpose.

The method ends in step 108.

In one further exemplary embodiment, the method also includes the optional step 104. In this step the ascertained vehicle behavior and/or vehicle state is compared with comparison data, the comparison data representing vehicle behaviors or vehicle states to be expected. In this particular exemplary embodiment, the vehicle behavior is compared with rules laid down in the road traffic act. Used as comparison data for the vehicle state in this exemplary embodiment are image data of operative vehicles in a "normal state" from different viewing angles. The comparison data may be received from a server but alternatively or additionally, may also be stored locally. In this exemplary embodiment, the data are available in an internal memory, but are updated at regular intervals via a connection to a cloud.

In step 105, an evaluation of this comparison, on the basis of which a committed rule infringement and/or an atypical vehicle state is/are detected, takes place accordingly.

In another exemplary embodiment of the present method, after the detection of a rule infringement and/or an atypical vehicle state, a signal that represents the detected rule infringement and/or the detected atypical vehicle state is generated in an optional step 106.

In the likewise optional step 107, this signal is made available to additional functions. In this particular exemplary embodiment, the signal is made available to a safety function, which alerts a driver to a detected rule infringement and/or to an atypical vehicle state in that it actuates a device for generating optical, acoustic, and haptic signals. This method also ends in step 108.

Figure 2:
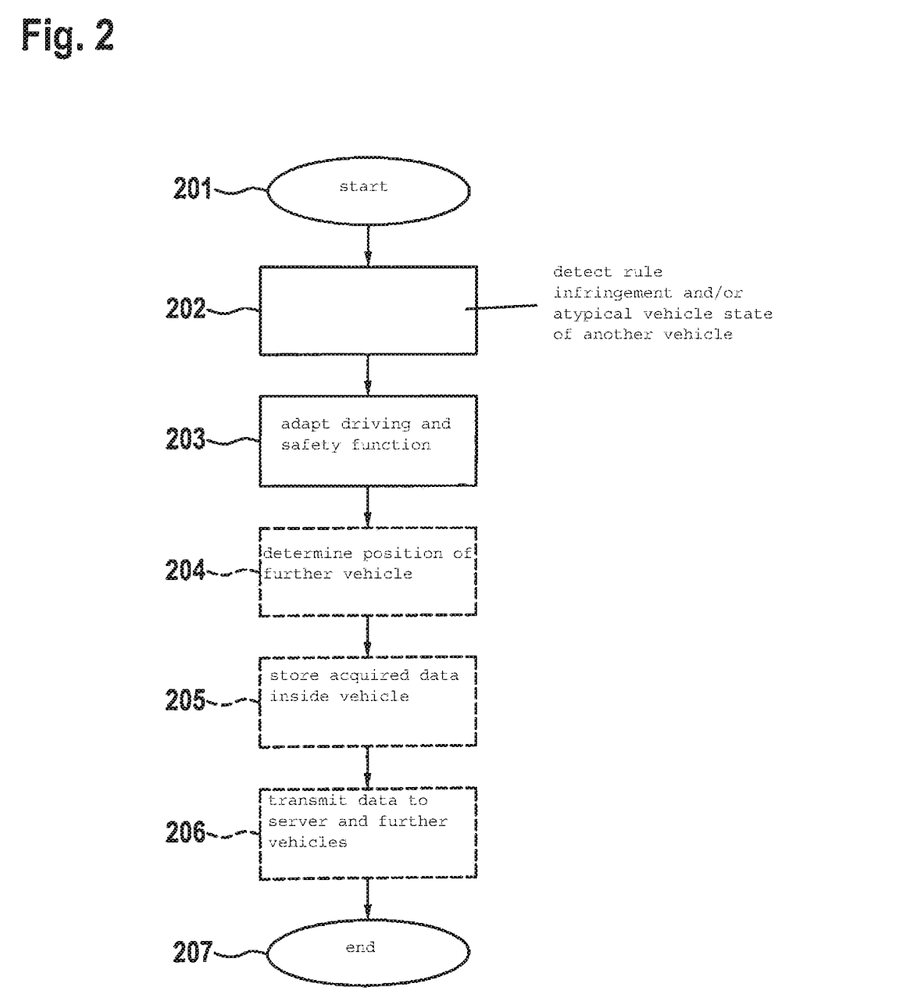
FIG. 2 shows a schematic method diagram.

FIG. 2 illustrates a schematic sequence of a method for adapting a driving and/or safety function of a vehicle 301. In the following exemplary embodiment, a driving and a safety function, which are implemented in vehicle 301 in each case, are adapted. In general, however, it is also possible to adapt either a driving or a safety function. The method begins in step 201.

In step 202, a committed rule infringement and/or a detected atypical vehicle state of another vehicle 302 is/are detected. In this particular exemplary embodiment, the method for detecting a committed rule infringement is executed in vehicle 301. Vehicle 301 is equipped with an environmental sensor system, which includes a camera for this purpose. The camera is used for the acquisition of environmental data, which are received by a processing unit. The environmental data are evaluated in this processing unit, and further vehicle 302 is detected in the process. The vehicle behavior of further vehicle 302 is analyzed in addition. Taken into account in this analysis are also the current position and traffic situation in which further vehicle 302 finds itself. Traffic rules that apply at the position of further vehicle 302 are determined, such a determination taking place by a detection of traffic signs on the one hand, or by polling data stored in an internal memory on the other hand. It is subsequently determined whether a rule infringement has occurred by comparing the prevailing traffic rules and the ascertained vehicle behavior.

Figure 3:
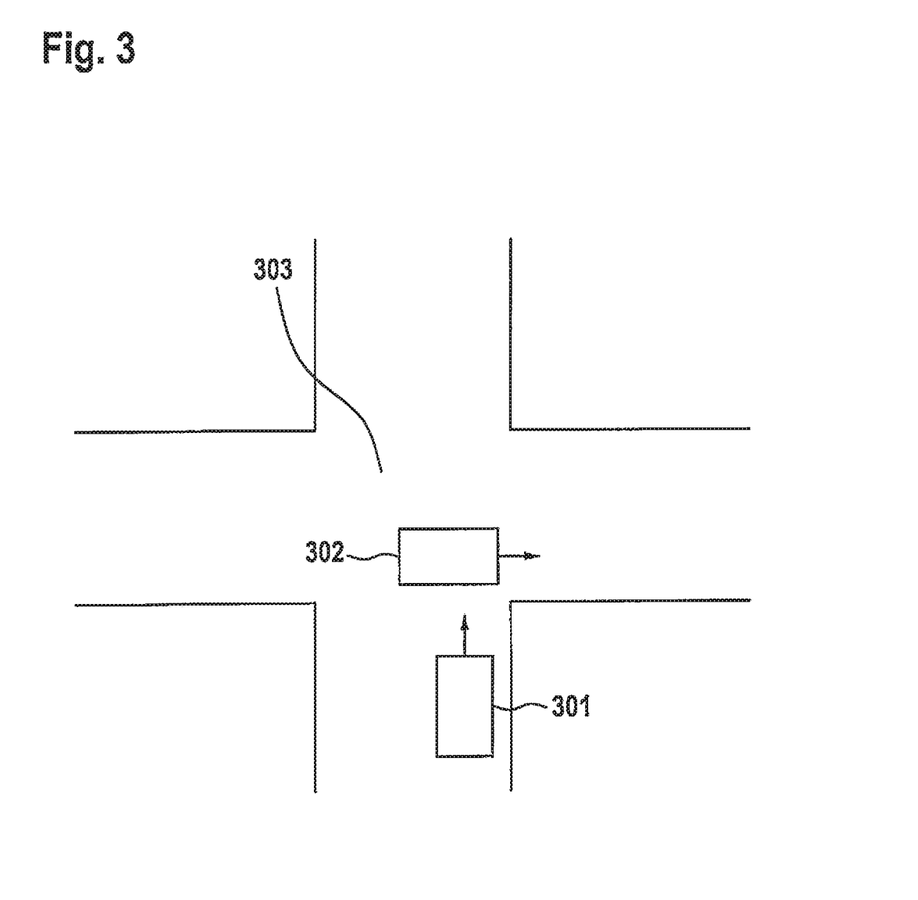
FIG. 3 shows a traffic situation.

In this exemplary embodiment, speeding of further vehicle 302 at an intersection 303 is determined with the aid of the afore-described method for detecting a committed rule infringement. This situation is illustrated in FIG. 3.

In step 203, the driving and safety function of vehicle 301 is adapted as a function of the detected rule infringement. Because an intersection 303, which vehicle 301 will be crossing as well, is approached by further vehicle 302 at an excessive speed, the speed of vehicle 301 is reduced by an adaptation of its driving function. The driving function, which is implemented in vehicle 301, is able to assume both the transverse and the linear control of vehicle 301 in an automated manner.

Although vehicle 301 would have the right of way vis-à-vis further vehicle 302, vehicle 301 is ultimately stopped in front of the intersection through an adaptation of the driving function. This is done in an effort to avoid an accident with further vehicle 302 that is ignoring the traffic rules and is also ignoring the right of way of vehicle 301 in this particular exemplary embodiment.

In addition to the adaptation of the driving function of vehicle 301, an adaptation of the safety function of vehicle 301 takes place at the same time. The safety function is designed to actuate a plurality of occupant-protection devices available in vehicle 301. For one, the safety function may actuate a device for warning a vehicle occupant, such as warning lights, loudspeakers, and a vibrating device in the seat of a vehicle occupant, while airbags are able to be actuated for another. In addition, the seating position of a vehicle occupant may be modified in order to bring the occupant into an optimal position.

In this exemplary embodiment, after the rule infringement has been detected, a warning is output to the vehicle occupant in that an acoustic signal is generated and an emergency signal starts to blink. Moreover, during the adaptation of the safety function, which is configured to actuate the occupant-protection devices, a trigger threshold for triggering the occupant-protection devices is modified. In this exemplary embodiment, the threshold for triggering the occupant airbags is lowered toward this end so that the occupant airbags are able to be triggered more rapidly in the event of an accident.

The present method ends in step 207.

In one alternative exemplary embodiment, no detection of a committed rule infringement and/or no detection of an atypical vehicle state take(s) place in step 202; instead, a signal that represents a committed rule infringement and/or a detection of an atypical vehicle state is received. In this case, the signal is received from an external server on which data pertaining to committed rule infringements at specific locations or pertaining to atypical vehicle states are conditioned. In order to be able to make such data available, the afore-described method for detecting a committed rule infringement and/or an atypical vehicle state of a vehicle is carried out on the server. For this purpose, the server receives data that were acquired with the aid of an environmental sensor system. In this exemplary embodiment, these data come from a plurality of vehicles, which transmit their environmental data to the server via a data link. On the server, these data are evaluated, and in the course of such an evaluation a vehicle behavior and/or a vehicle state is/are ascertained on the basis of the environmental data. A committed rule infringement and/or an atypical vehicle state is/are subsequently detected through a comparison with traffic rules and/or different vehicle states.

In one further exemplary embodiment, the additional, optional step 204 is carried out, in which a determination of the position of further vehicle 302 takes place. Vehicle 301 includes a position-determination unit for this purpose.

In the likewise optional step 205, the ascertained position of further vehicle 302 that has committed a rule infringement and/or exhibits an atypical vehicle state is stored in an internal memory available in vehicle 301. Apart from the position, the type of rule infringement and the date and time of day are stored in the process. These data may later be used to carry out an automatic adaptation of the driving and/or safety function of vehicle 301 when vehicle 301 is coming closer to this position. The adaptation may take place independently of whether another rule infringement and/or an atypical vehicle state was/were detected at this position. In the event that rule infringements or atypical vehicle states are detected at a position multiple times, the driving and/or safety function is/are adapted to the number of detected committed rule infringements and/or atypical vehicle states. In this exemplary embodiment, the velocity of the vehicle is further reduced, and a threshold for triggering restraining devices in the safety function is lowered even further.

In one further exemplary embodiment, the method includes optional step 206 in addition to optional step 204. In this step 206, the data stored in an internal memory in step 205 in the previously described exemplary embodiment are transmitted to a server and to additional vehicles. To do so, vehicle 301 is equipped with a communications device by which a connection to further vehicles or to the server is possible. This allows the data to be made available to multiple road users so that these road users are able to be informed of a potential dangerous situation or so that an adaptation of driving and safety functions of other vehicles may take place.

In one further exemplary embodiment, the data acquired in step 204 are stored inside the vehicle in step 205 and also transmitted to a server and to additional vehicles in step 206.

In one further exemplary embodiment, the location of the further vehicle that has committed a rule infringement and/or exhibits an atypical vehicle state is not detected. However, an item of information pertaining to a detected committed rule infringement and/or an atypical vehicle state of the further vehicle is/are transmitted to road users in the environment of the vehicle. For example, this information may be warning information that indicates a potentially dangerous situation to the additional road users.

Figure 4:
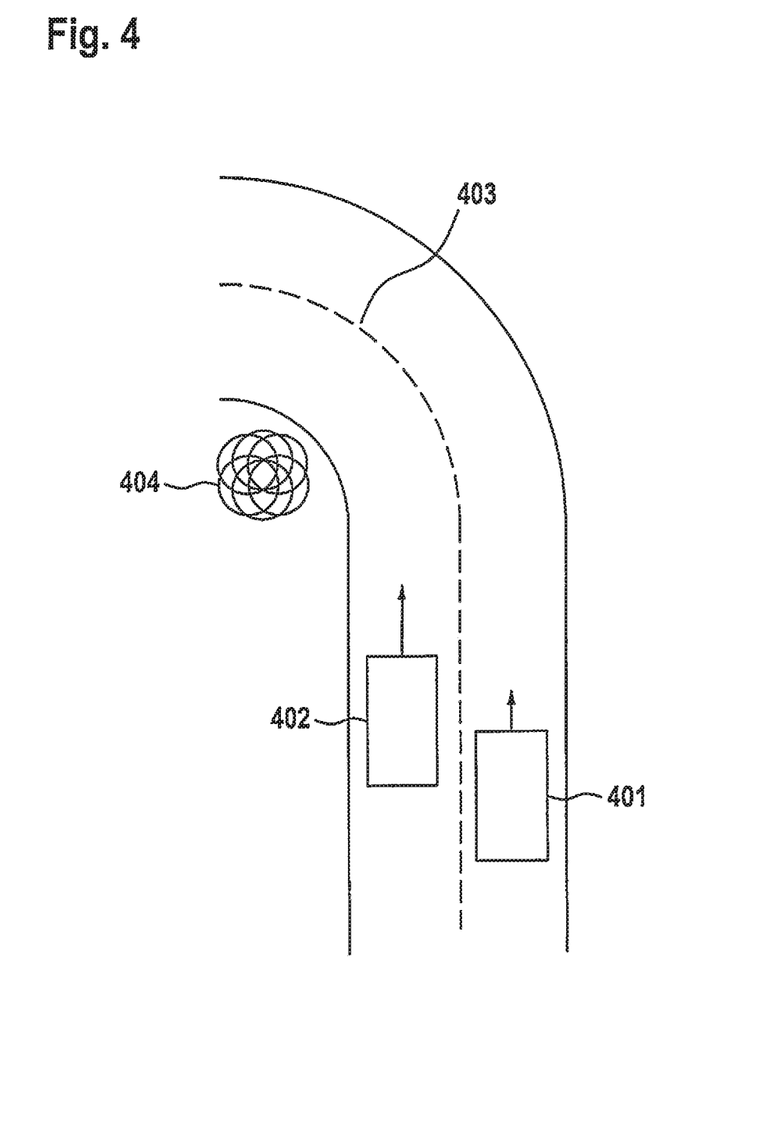
FIG. 4 shows a further traffic situation.

FIG. 4 shows another dangerous situation. Here, vehicle 401 is overtaken by further vehicle 402 ahead of a curve 403 that is not visible on account of an obstacle 404. The rule infringement of further vehicle 402 is detected by a method for detecting a rule infringement that is running inside vehicle 401. As a result, a safety function implemented in vehicle 401 is adapted by lowering the threshold for triggering the occupant airbags.

Since at the time of the passing maneuver of further vehicle 402, vehicle 401 is operated in a highly automated manner using a driving function in which the driving function assumes both the transverse and the linear control, an adaptation of the driving function takes place in addition. Because it may be assumed that a further rule infringement or an aggressive and dangerous driving behavior is to be expected from vehicle 402, the linear control of vehicle 401 is adapted in such a way that a safety distance from vehicle 402, which is now traveling ahead, will be observed. This distance is selected to be large enough so that a comfortable deceleration of vehicle 401 down to a standstill is possible in the event that vehicle 402 happens to stop abruptly. Since curve 403 is visually shielded, vehicles may be stopped behind this curve, into which further vehicle 402 would crash at full speed.

In one further exemplary embodiment, a vehicle is traveling on a superhighway and is operated in an automated manner with the aid of a driving function. Via a communications device integrated into the vehicle, a signal that represents a detected atypical vehicle state of another vehicle is received inside the vehicle. This signal contains information according to which a further vehicle, which has a flat tire that is beginning to emit smoke, is located at a distance of 1000 m from the current position of the vehicle. Since greater caution is required, the driving function is adapted in such a way that the driving task of controlling the transverse and linear guidance of the vehicle is returned to a vehicle occupant. For this purpose, the driver is acoustically and visually alerted to the situation and to the return of the control. As the seat of the driver has been turned toward the rear in this particular exemplary embodiment, the takeover is delayed so that a reduction of the speed is also implemented prior to the takeover. Once the driver has been automatically brought into the correct position and is ready to take control of the vehicle, the driving task is handed over to the driver.

Depending on the driving situation, other adaptations of a driving function are possible as well. Able to be initiated, for example, are a reduction in speed, driving to the side, parking or an emergency stop of the vehicle.

What is claimed is:

1. A method for adapting at least one of a driving function of a host vehicle and a safety function of the host vehicle, the method comprising the following steps:
   acquiring environmental data using an environmental sensor system of the host vehicle, the step of acquiring includes using: (i) a camera of the host vehicle, or (ii) a lidar sensor of the host vehicle, or (iii) an ultrasonic sensor of the host vehicle, or (iv) a radar system of the host vehicle;
   ascertaining, by the host vehicle, based on the acquired environmental data, an operation of the second vehicle or a state of the second vehicle, wherein the second vehicle is separate from the host vehicle;
   detecting, by the host vehicle and based on the ascertained operation of the second vehicle or the ascertained state of the second vehicle, an atypical state of the second vehicle and a traffic law violation by the second vehicle;
   adapting, automatically by the host vehicle, the at least one of the driving function of the host vehicle and the safety function of the host vehicle, as a function of the detected atypical vehicle state of the second vehicle;
   wherein the step of adapting further includes lowering a trigger threshold, as a function of the detected traffic law violation by the second vehicle, wherein the safety function deploys an occupant-protection device of the host vehicle when the trigger threshold is exceeded; and wherein the atypical vehicle state of the second vehicle includes at least one of the following: (i) the second vehicle is on fire, (ii) a tire of the second vehicle is low on air and/or is flat, (iii) the second vehicle is emitting smoke, (iv) the second vehicle is weaving side to side, (v) a cumulative change in a lateral position of the second vehicle in relation to a traffic lane boundary exceeds a first predefined threshold within a first predefined time period, (vi) repeated braking or repeated acceleration, by the second vehicle within a second predefined time period, exceeds a second predefined threshold.

2. The method as recited in claim 1, further comprising the following step:

performing, by the driving function, a driving task in an automated manner, the driving task including controlling, by the driving function, transverse guidance of the host vehicle and linear guidance of the host vehicle;

wherein the step of adapting includes returning the driving task to a driver of the host vehicle, as a function of the detected traffic law violation by the second vehicle.

3. The method as recited in claim 1, further comprising the following step:

performing, by the driving function, a driving task in an automated manner, the driving task including controlling, by the driving function, transverse guidance of the vehicle and linear guidance of the vehicle;

wherein the step of adapting includes selecting a safety distance to the second vehicle, and using the selected safety distance by the driving function, in performing the driving task.

4. The method as recited in claim 1, further comprising the following steps:

detecting, after the detecting of the traffic law violation by the second vehicle, a position of the traffic law violation by the second vehicle using a position-determination unit of the host vehicle; and (i) storing the detected position in an internal memory of the host vehicle, and/or (ii) transmitting the detected position to an external cloud server using a communications unit of the host vehicle.

5. The method as recited in claim 1, wherein the step of adapting is performed as a function of a number of detected traffic law violations by the second vehicle.

6. The method as recited in claim 1, further comprising the following step:

transmitting, by the host vehicle to an external cloud server, an item of information pertaining to the detected traffic law violation by the second vehicle.

7. The method as recited in 1, further comprising the following step:

performing, by the driving function, a driving task in an automated manner, the driving task including controlling, by the driving function, transverse guidance of the host vehicle and linear guidance of the host vehicle;

wherein the step of adapting includes returning the driving task to a driver of the host vehicle, as a function of the detected atypical vehicle state of the second vehicle.

8. A processor in a host vehicle configured to adapt at least one of a driving function of the host vehicle and a safety function of the host vehicle, the processor configured to:

acquire environmental data using an environmental sensor system of the host vehicle, the step of acquiring includes using: (i) a camera of the host vehicle, or (ii) a lidar sensor of the host vehicle, or (iii) an ultrasonic sensor of the host vehicle, or (iv) a radar system of the host vehicle;

ascertain, based on the acquired environmental data, an operation of the second vehicle or a state of the second vehicle, wherein the second vehicle is separate from the host vehicle;

detecting, based on the ascertained operation of the second vehicle or the ascertained state of the second vehicle, an atypical state of the second vehicle and a traffic law violation by the second vehicle;

adapt, automatically by the host vehicle, the at least one of the driving function of the host vehicle and the safety function of the host vehicle, as a function of the detected atypical vehicle state of the second vehicle;

wherein the automatic adaption further includes lowering a trigger threshold, as a function of the detected traffic law violation by the second vehicle, wherein the safety function deploys an occupant-protection device of the host vehicle when the trigger threshold is exceeded; and wherein the atypical vehicle state of the second vehicle includes at least one of the following: (i) the second vehicle is on fire, (ii) a tire of the second vehicle is low on air and/or is flat, (iii) the second vehicle is emitting smoke, (iv) the second vehicle is weaving side to side, (v) a cumulative change in a lateral position of the second vehicle in relation to a traffic lane boundary exceeds a first predefined threshold within a first predefined time period, (vi) repeated braking or repeated acceleration, by the second vehicle within a second predefined time period, exceeds a second predefined threshold.

9. The processor as recited in claim 8, wherein the processor is further configured to:

perform a driving task in an automated manner, the driving task including controlling transverse guidance of the host vehicle and linear guidance of the host vehicle;

wherein the automatic adaption includes the processor returning the driving task to a driver of the host vehicle, as a function of the detected traffic law violation by the second vehicle.

* * * * *